United States Patent
Moon et al.

(10) Patent No.: US 8,364,457 B2
(45) Date of Patent: Jan. 29, 2013

(54) SIMULATION APPARATUS AND METHOD USED FOR SENSOR NETWORK

(75) Inventors: Young Bag Moon, Goyang Si (KR); Sang Joon Park, Daejeon (KR); Young Hwan Ham, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1030 days.

(21) Appl. No.: 12/366,362

(22) Filed: Feb. 5, 2009

(65) Prior Publication Data
US 2010/0054234 A1 Mar. 4, 2010

(30) Foreign Application Priority Data
Aug. 27, 2008 (KR) .................. 10-2008-0084010

(51) Int. Cl.
*G06F 17/50* (2006.01)
(52) U.S. Cl. ........................................ 703/13
(58) Field of Classification Search .............. 703/13; 709/223
See application file for complete search history.

(56) References Cited

U.S. PATENT DOCUMENTS
2006/0209866 A1* 9/2006 Steenkiste et al. ............ 370/419

FOREIGN PATENT DOCUMENTS
KR 10-2007-0056269 6/2007
KR 10-2007-0058957 6/2007

OTHER PUBLICATIONS

Maneesh Varshney, Defeng Xu, Mani Srivastava, Rajive Bagrodia, SenQ: A Scalable Simulation and Emulation Environment for Sensor Networks, ACM IPSN'07, Apr. 25-27 2007, pp. 196-205.*
Yong-Sang Kim, Chae-Deok Im, Yong-Hun Choi, Jong-Hyeon Kim, "Apparatus and Method for debugging Sensor Network using simulation", Korean Patent Application No. 10-2006-0072506, published on Jun. 11, 2007, English Translation.*

* cited by examiner

*Primary Examiner* — Dwin M Craig
(74) *Attorney, Agent, or Firm* — Kile Park Goekjian Reed & McManus PLLC

(57) ABSTRACT

Provided are a simulation apparatus and method used to simulate a sensor network. A sensor node of a real node is reflected in a simulation, and bidirectional communication is performed between a real node and a virtual node, in order to reflect a real environment and a simulation environment in each other and make the real node and the virtual node consistent with each other, thereby performing simulation.

14 Claims, 5 Drawing Sheets

SIMULATION APPARATUS AND METHOD USED FOR SENSOR NETWORK

CROSS-REFERENCE TO RELATED PATENT APPLICATION

This application claims the benefit of Koran Patent Application No. 10-2008-0084010, filed on Aug. 27, 2008, in the Korean Intellectual Property Office, the disclosure of which is incorporated herein in its entirety by reference.

BACKGROUND OF THE INVENTION

1. Field of the Invention

The present invention relates to a simulation apparatus and method used to simulate a sensor network, and more particularly, to a simulation apparatus and method used to simulate a sensor network, wherein a sensor node of a real testbed is reflected in a simulation and enabling bidirectional communication between a real node and a virtual node so as to reflect a status of the real node in a simulation and reflect a simulation status in the real node, thereby making a real physical environment and a simulation environment consistent with each other and performing simulation.

2. Description of the Related Art

Wireless sensor networks, which involve environment and ecosystem monitoring, and forest fire and flood control, are scattered outdoors in a wide area where sensing information is collected in real-time through various types of network sensors, such as an image sensor, an ultrasound wave sensor, an infrared sensor, a temperature sensor, a humidity sensor, an illumination sensor, and the like. Therefore, these wireless sensor networks are influenced by spatial information such as topography and natural features, and are necessarily designed in consideration of the characteristics of sensors and limited resources (battery power, memory, CPU capabilities, etc.) of sensor nodes. Simulation is generally conducted to optimize wireless sensor networks.

Simulation systems of conventional sensor networks reflect a real node in a simulation in order to obtain a result from the simulation or input data generated by the real node into the simulation. However, when a real node communication environment and a simulation communication environment are not consistent with each other, one of the results relating to the two environments is reflected.

SUMMARY OF THE INVENTION

The present invention provides a simulation system used for a sensor network by reflecting a sensor node of a real testbed in a simulation and enabling bidirectional communication between a real node and a virtual node so as to perform continuous communication in a state where a real environment and a simulation environment are consistent with each other.

According to an aspect of the present invention, there is provided a simulation apparatus used to simulate a sensor network, the apparatus comprising: a simulation unit generating a virtual sensor network by using a virtual node corresponding to a real node on a testbed and a simulation node neighboring the virtual node and existing only in a simulation; and a synchronization unit supporting bidirectional communication between the real node and the virtual node.

According to another aspect of the present invention, there is provided a simulation method used to simulate a sensor network comprising: generating a virtual sensor network by using a virtual node corresponding to a real node on a testbed and a simulation node neighboring the virtual node and existing only in a simulation; and performing bidirectional communication between the real node and the virtual node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
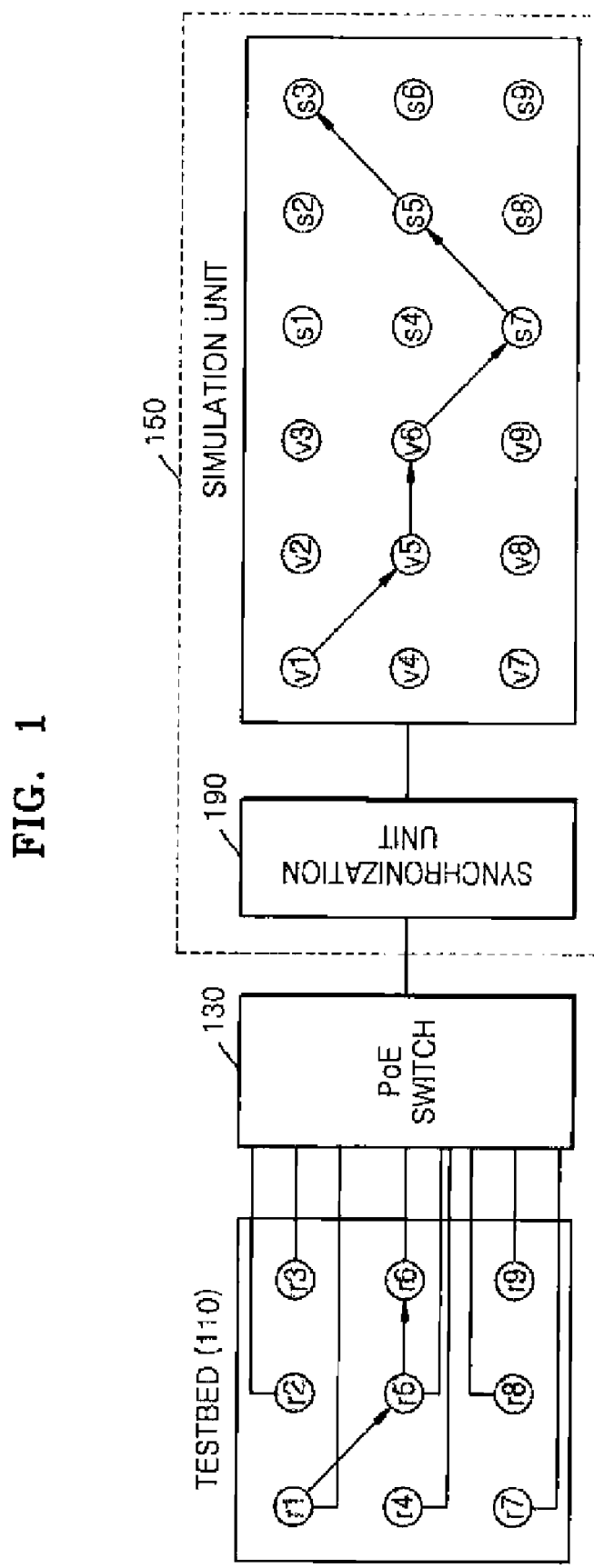
FIG. 1 is a block diagram of a testbed and a simulation apparatus according to an embodiment of the present invention.

Hereinafter, the present invention will be described more fully with reference to the accompanying drawings, in which exemplary embodiments of the invention are shown. Like reference numerals designate like elements throughout the specification. While describing the present invention, detailed descriptions about related well known functions or configurations that may blur the points of the present invention are omitted.

In addition, unless explicitly described to the contrary, the word "comprise" and variations such as "comprises" or "comprising" will be understood to imply the inclusion of stated elements but not the exclusion of any other elements. The term "unit" may be formed so as to perform at least one specific function or operation and may refer to a hardware component or a software component or a combination thereof.

To achieve the above objective, a simulation system used for a sensor network according to the present embodiment constitutes a virtual sensor network and comprises a simulation unit (virtual nodes refer to nodes corresponding to real nodes, and simulation nodes refer to nodes existing only in a simulation) that enables some nodes in a simulation to correspond to real nodes and a synchronization unit that enables bidirectional communication between the real nodes and the virtual nodes.

The synchronization unit may provide the real nodes with information about the simulation nodes. When the virtual nodes transfer packets to the simulation nodes, the synchronization unit may transmit an ACK signal to the real nodes to inform the real nodes of the transfer of packets. When the virtual nodes cannot transmit packets even though the real nodes transmit packets, the linking unit may enable the real nodes to delay real transmission of packets according to a carrier sensing result. Also, the synchronization unit may enable the virtual nodes to discard received packets when the real nodes do not receive packets, and may enable the real nodes to discard received packets when the virtual nodes do not receive packets.

FIG. 1 is a block diagram of a testbed 110 and a simulation apparatus 150 according to an embodiment of the present invention. Referring to FIG. 1, the testbed 110 is synchronized with the simulation apparatus 150 via a switch 130. Nine nodes of the testbed 110 search for their respective adjacent nodes and manage a neighbor table with regard to neighboring nodes. However, the testbed 110 has information about the nine arranged real nodes.

The simulation apparatus 150 is a virtual environment including a plurality of virtual nodes v1 through v9 that match a plurality of real nodes r1 through r9, respectively, and a plurality of simulation nodes s1 through s9 that are virtually added and generated for simulation on a virtual testbed. The simulation apparatus 150 comprises a simulation unit 170 and a synchronization unit 190. In the present embodiment, the simulation unit 170 comprises a total of 18 nodes, such as the nine virtual nodes v1 through v9 and the nine simulation nodes s1 through s9 with regard to the nine nodes of the testbed 110. The number of virtual nodes depends on the number of real nodes on the testbed. The number of simulation nodes may vary according to the establishment of a system environment.

The virtual nodes v1 through v9 are generated by reflecting the real nodes r1 through r9. A plurality of packets generated by the nodes r1 through r9 of he real testbed are reflected in the virtual nodes v1 through v9 of the virtual testbed. The simulation nodes s1 through s9 exist only in simulation and are neighboring nodes of the virtual nodes v1 through v9.

The synchronization unit 190 connects a real environment to a virtual environment and reflects a packet transmission in the real environment in the virtual environment. If the simulation node s3 is a sync node, since the real testbed environment does not have a node corresponding to the simulation node s3, the real node r6 cannot transmit a packet to any real node after receiving the packet through r1 through r5. However, if the synchronization unit 190 is used to connect the real environment and the virtual environment, a packet transmitted by the real node r6 in the real environment is reflected in simulation, and is transmitted to the simulation nodes s7 and s5 and the sync node s3 via the virtual nodes v1, v5, and v6 corresponding to the real nodes r1, r5, and r6.

In order to perform such a process, a neighbor table with regard to all the nodes is prepared in a simulation environment, and information about the simulation nodes s1, s4, and s7 that are neighboring nodes of the virtual nodes v3, v6, and v9 during simulation must be transmitted to the real nodes r3, r6, and r9 on the real testbed. As a result, the real node r6 has the neighbor table including information about the simulation node s7 and transmits a packet to the simulation node s7. The synchronization unit 190 sends the actual sent packet to the simulation node s7 in simulation. Also, after the synchronization unit 190 sends a packet to the simulation node s7, it sends a predetermined confirmation signal such as an ACK signal indicating that the packet is transmitted to the simulation node r7 to the real node r6 on the testbed so that the real node r6 does not retransmit the packet.

The synchronization unit 190 may be integrally formed with the simulation unit 170 as an element of the simulation apparatus 150 or may be a separate synchronization apparatus connecting the testbed and the simulation apparatus 150.

Figure 2:
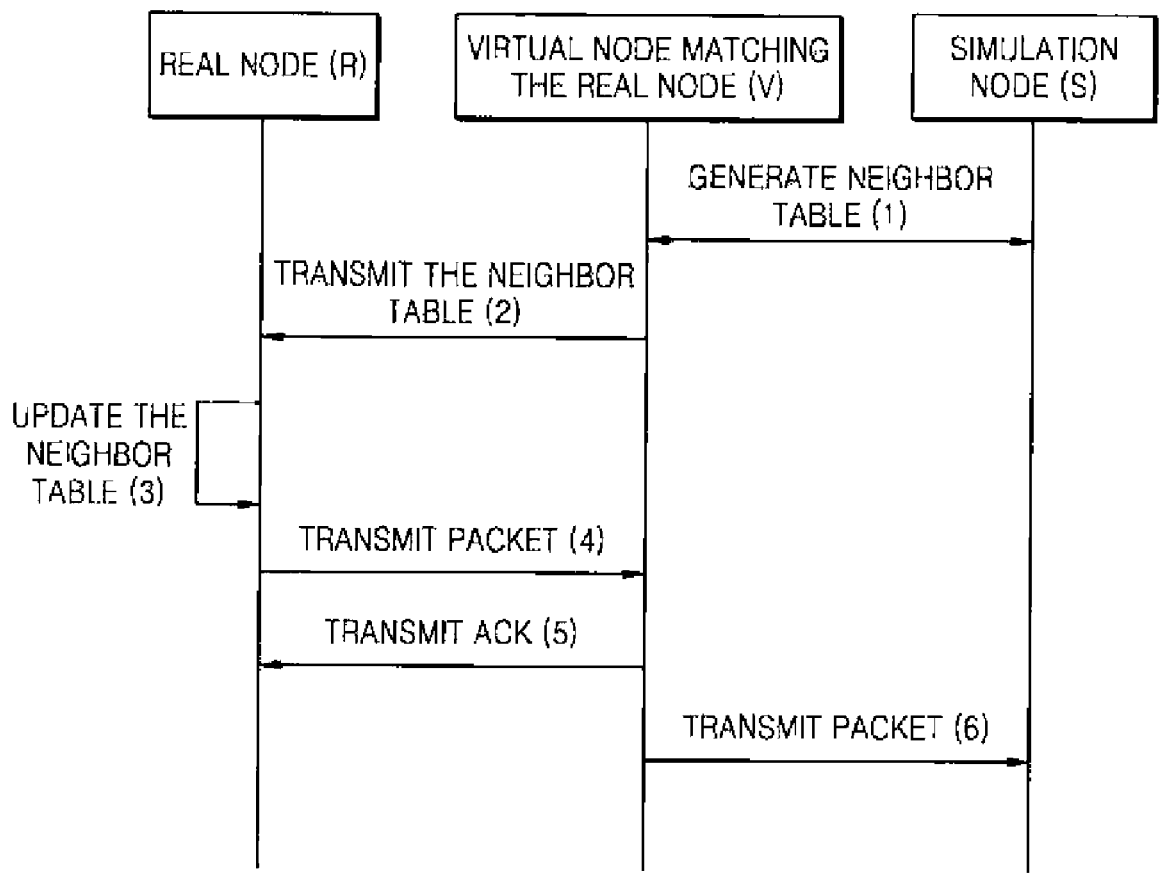
FIG. 2 is a data flow diagram illustrating a packet flow between a virtual node and a simulation node according to an embodiment of the present invention.

FIG. 2 is a data flow diagram illustrating a packet flow between a virtual node V and a real node R according to an embodiment of the present invention. Referring to FIG. 2, the virtual node V and the simulation node S that are generated during simulation generate a neighbor table in operation 1.

The virtual node V transmits the neighbor table of the virtual node V to a real node R via a synchronization unit in operation 2. The virtual node V matches to the real node R.

The real node R reflects the neighbor table received via the synchronization unit in a neighbor table of the real node R and renews the neighbor table in operation 3.

The real node R sends a packet to the simulation node S that does not exist in the real testbed but exists in a simulation according to the reflected neighbor table. The synchronization unit receives the packet, and transmits the packet to the virtual node V matching the real node R in operation 4.

The virtual node V transmits an ACK signal to the real node R via the synchronization unit to prevent the real node R from retransmitting the packet in operation 5.

Thereafter, the virtual node V transmits the packet to neighboring nodes including the simulation node S during simulation in operation 6. The virtual node V may transmit the packet to the simulation node S and transmit the ACK signal to the real node S by changing the order of operations 5 and 6.

Therefore, the packet that is generated in the real testbed and is transmitted via each node is continuously reflected in the simulation so that the packet is transmitted to a sync node that is a simulation node.

Hereinafter, unless otherwise defined, a real node is expressed as an r node (or an R node), a virtual node corresponding to the r node during simulation is expressed as a v node (or a V node), and a simulation node existing only during simulation and being a neighboring node of the v node is expressed as an s node (or an S node).

Figure 3:
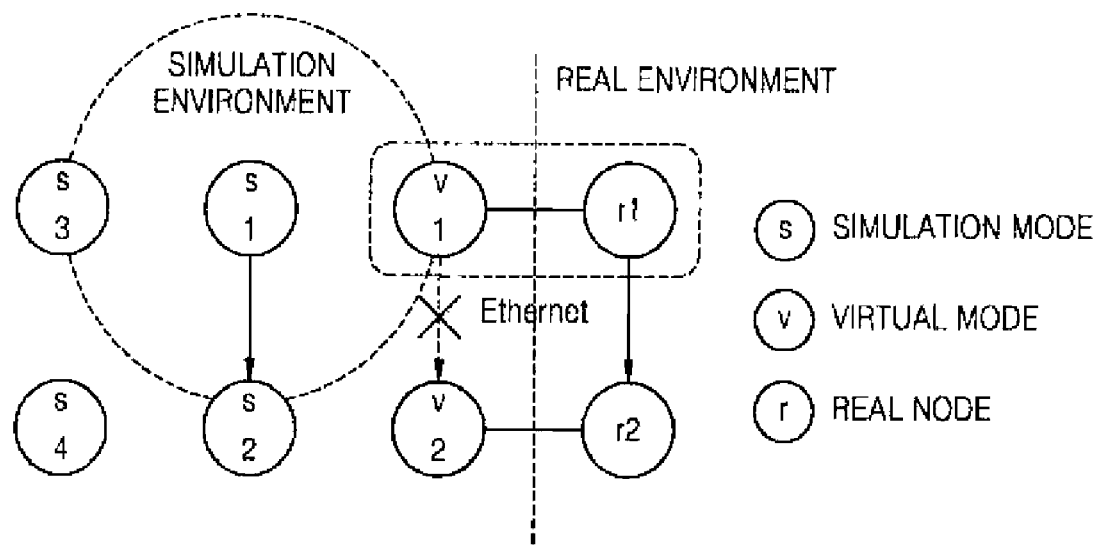
FIGS. 3 and 4 are diagrams for explaining a process of establishing a consistent packet transmission environment between a real node and a virtual node according to an embodiment of the present invention.
Figure 4:
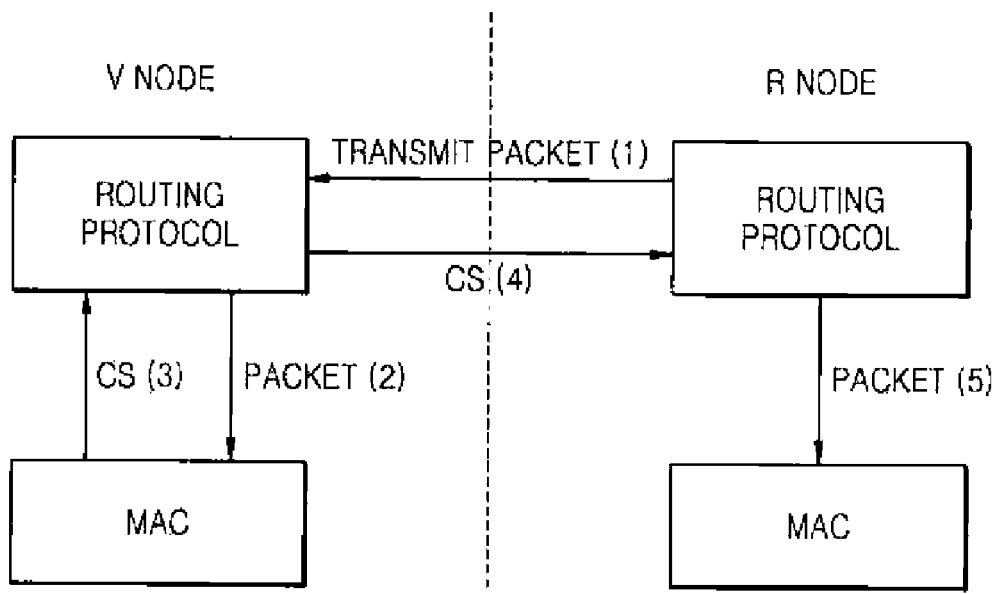

FIGS. 3 and 4 are diagrams for explaining a process of establishing a consistent packet transmission environment between an r node and a v node according to an embodiment of the present invention. Referring to FIG. 3, if communication is performed from an r1 node to an r2 node in a real environment, communication must be performed from a v1 node matching the r1 node to a v2 node matching the r2 node in a simulation. In the present embodiment, communication of the v1 node is not performed due to communication of the s1 node in a simulation environment. In this regard, a tree routing code correction may be made but a media access control (MAC) code correction is not made.

The data transmission environment of the r node depends on the environment of the v node. If the v node does not transmit the data, it is determined whether to transmit data according to a carrier sensing (CS) result of the v node. In more detail, the r1 node delays transmitting the data until the v1 node transmits the data according to the CS result.

Referring to FIG. 4, if an R node transmits a packet to neighboring nodes, a routing protocol of the R node sends the packet to the V node matching the R node before sending the packet to a MAC layer in operation 1.

The V node receives the packet from the R node, sends the packet to its MAC layer in operation 2, receives the CS result from its MAC layer in operation 3, and transmits the CS result to the R node in operation 4.

The R node delays transmitting the packet until receiving the CS result from the V node, if it is possible to transmit the packet according to the CS result, and sends the packet to the MAC layer in operation 5.

Figure 5:
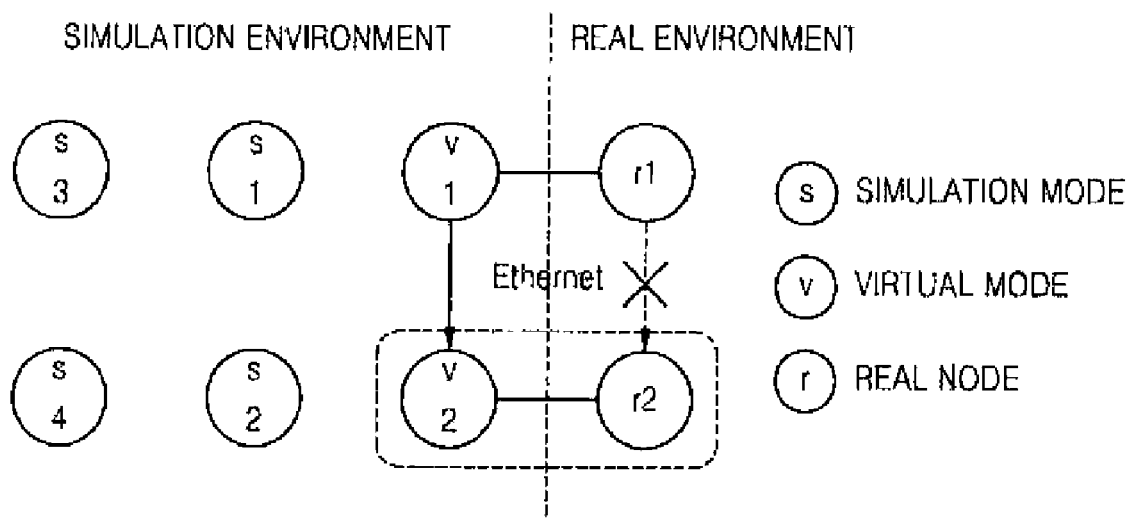
FIGS. 5 and 6 are diagrams for explaining a process of establishing a consistent packet transmission environment between a real node and a virtual node according to another embodiment of the present invention.
Figure 6:
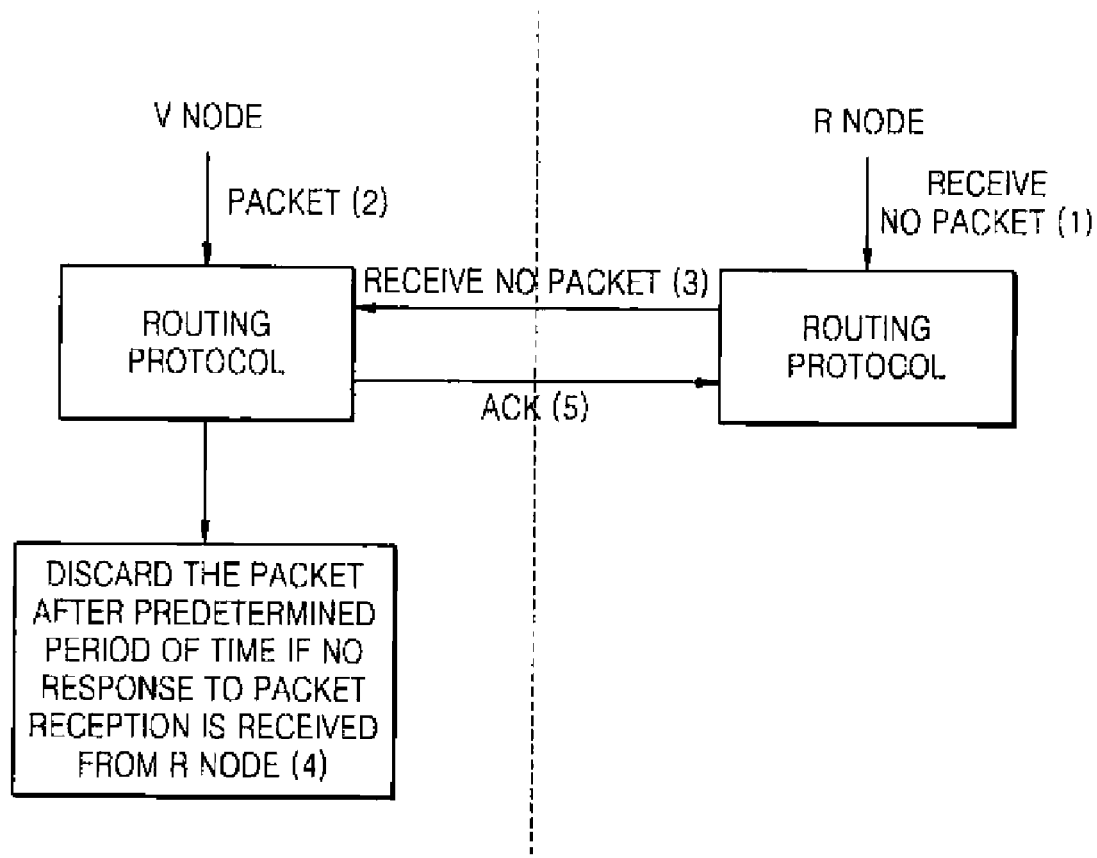

FIGS. 5 and 6 are diagrams for explaining a process of establishing a consistent packet transmission environment between an r node and a v node according to another embodiment of the present invention. In the present embodiment, communication is not performed from an r1 node to an r2 node in a real environment due to an obstacle or an instant communication error between the r1 node and the r2 node. In this regard, if an r node receives a packet, the r node sends the packet to a v node, and if the v node does not receive the packet from the r node, the v node assumes no reception of the packet and discards the received packet.

In a simulation environment, if a v2 node that is a reception node does not receive a communication packet from the r2 node, the v2 node reflects communication of the real environment and determines that no packet is received from the v1 node. In more detail, if the v2 node receives no packet from the r2 node that does not receive the packet from the r1 node, the v2 node assumes that the r2 node receives no packet from the r1 node, considers that it receives no packet from the v1 node, and discards the packet received from the v1 node.

Referring to FIG. 6, if an R node receives a packet, the R node sends the packet to a V node. If the R node does not receive a packet from an R node of a previous hop in operation 1, and the V node receives a packet from a V node of the previous hop in operation 2, the V node that has not received the packet from the R node confirms if a packet is received from the R node during a predetermined period of time.

If the V node does not receive the packet from the R node after the predetermined period of time in operation 3, the V node determines that the R node does not receive the packet from the previous R node, and discards the packet received from the V node of the previous hop in operation 4. At the same time, the V node informs the R node that no packet was received, in operation 5.

Figure 7:
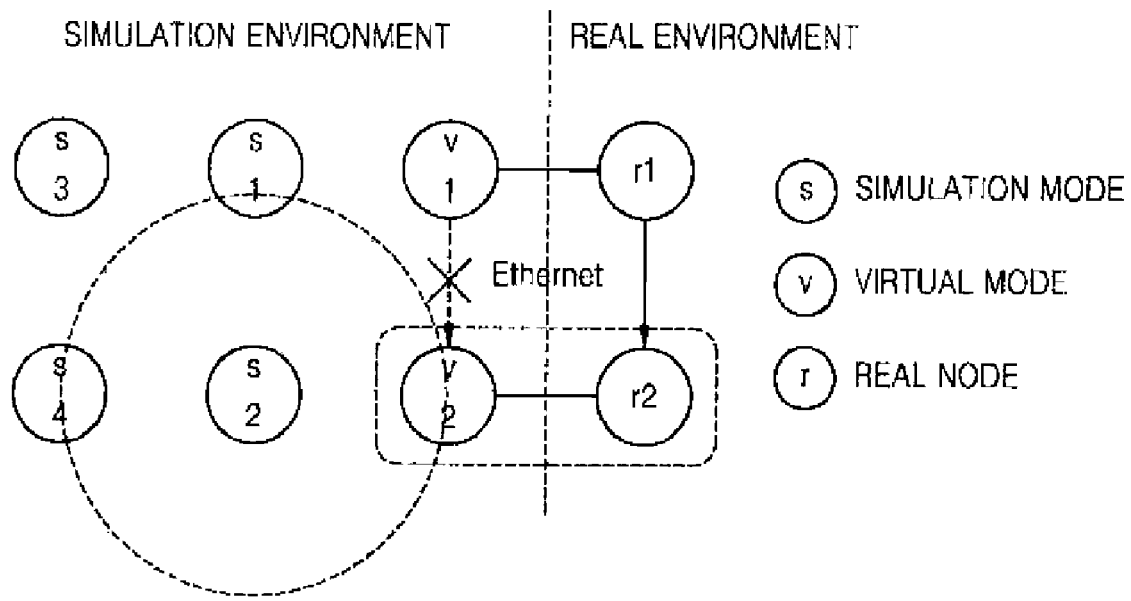
FIGS. 7 and 8 are diagrams for explaining a process of establishing a consistent packet transmission environment between a real node and a virtual node according to another embodiment of the present invention.
Figure 8:
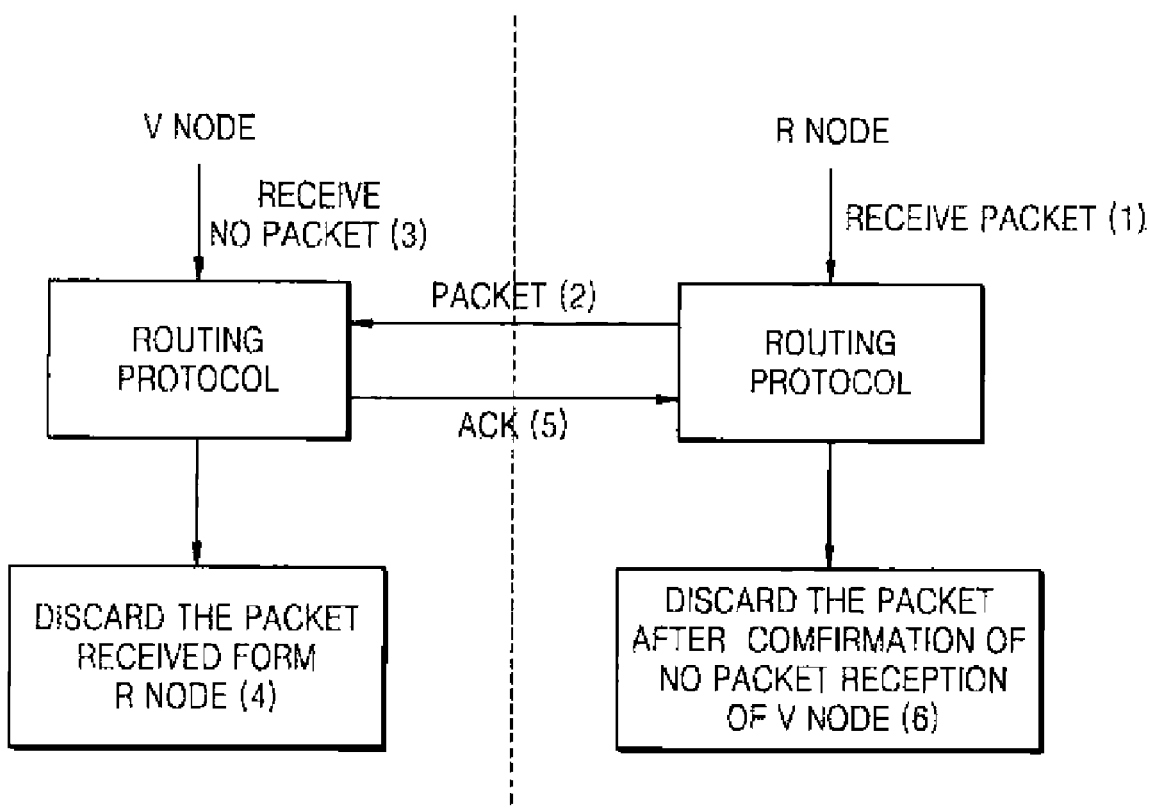

FIGS. 7 and 8 are diagrams for explaining a process of establishing a consistent packet transmission environment between an r node and a v node according to another embodiment of the present invention. Referring to FIG. 7, although communication is normally performed from an r1 node to an r2 node in a real environment, communication is not performed from a v1 node to a v2 node in a simulation environment. In this case, if an r node receives a packet, the r node sends the packet to a v node. Since the v node does not receive a packet from a previous v node, the v node informs the r node that no packet was received. The r node confirms that the v node did not receive the packet and discards the packet received from the previous r node.

In more detail, if the v2 node that is a reception node receives a communication packet from the r2 node that receives the packet from the r1 node, and, does not receive the communication packet from the v1 node, the v2 node informs the r2 node that no packet was received. The r2 node discards the packet received from the r1 node.

Referring to FIG. 8, an R node receives a packet from an R node of a previous hop in operation 1, and sends the packet to a V node by using a routing protocol before transmitting the packet to a node of a next hop in operation 2.

The V node receives the packet from the R node and the V node confirms if it received the same packet from a V node of a previous hop after a predetermined period of time. If the V node did not receive the same packet from the V node of the previous hop in operation 3, the V node discards the packet received from the R node in operation 4, and simultaneously informs the R node that no packet was received in operation 5.

After the R node confirms that the v node received no packet from the previous v node and discards the received packet in operation 6.

The present invention reflects a sensor node in a real testbed during simulation, and enables a real node and a virtual node to perform bidirectional communication, so that a status of the real node is reflected in the simulation and a simulation status is reflected in the real node, thereby making a real environment and a simulation environment consistent and facilitating simulation.

In alternative embodiments, hard-wired circuitry may be used in place of or in combination with a process/controller programmed with computer software instructions to implement the invention. Thus, embodiments of the invention are not limited to any specific combination of hardware circuitry and software.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

A simulation method used to simulate a sensor network according to the present invention establishes a virtual sensor network consisting of a virtual node corresponding to a real node and a simulation node adjacent to the virtual node, thereby preventing a communication flow from being discontinued.

Also, a communication status of the real node and a communication status of the virtual node are consistent with each other, which involves a consistency in a sensor network environment and a simulation environment, thereby facilitating optimization of the sensor network.

While the present invention has been particularly shown and described with reference to exemplary embodiments thereof it will be understood by one of ordinary skill in the art that various changes in form and details may be made therein without departing from the spirit and scope of the present invention as defined by the following claims.

What is claimed is:

1. A simulation apparatus used to simulate a sensor network, the apparatus comprising:
 a simulation hardware unit configured to generate a virtual sensor network, wherein the virtual sensor network comprises a virtual node corresponding to a real node on a testbed and a simulation node neighboring the virtual node and existing only in a simulation, and wherein the virtual node is configured to communicate with the simulation node; and
 a synchronization hardware unit configured to support bidirectional communication between the real node and the virtual node such that a communication status of either the virtual node or the real node is reflected in a communication status of the other node.

2. The apparatus of claim 1 wherein the synchronization hardware unit is configured to transmit a neighbor table that is generated by the virtual node and the simulation node to the real node so that the real node includes information about the simulation node.

3. The apparatus of claim 1, wherein the synchronization hardware unit is configured to receive a packet that was received by the real node from a previous hop node and to transmit the packet to a corresponding virtual node.

4. The apparatus of claim 3, wherein, if a node of a next hop of the real node is the simulation node, the synchronization hardware unit is configured to transmit an acknowledge signal, indicating that the corresponding virtual node transmitted the packet to the simulation node, to the real node.

5. The apparatus of claim 1, wherein the synchronization hardware unit is configured to delay transmitting the packet to the node of a next hop of the real node according to a carrier sensing (CS) result of the corresponding virtual node.

6. The apparatus of claim 1, wherein, if the real node does not receive the packet from a real node of a previous hop and the corresponding virtual node receives the same packet from a virtual node of the previous hop, the synchronization hardware unit is configured to control that the corresponding virtual node discards the packet received from the virtual node of the previous hop.

7. The apparatus of claim 1, wherein, if the real node receives the packet from a real node of the previous hop and the corresponding virtual node does not receive the same packet from a virtual node of the previous hop, the synchronization hardware unit is configured to control that the real node discards the packet received from the real node of the previous hop.

8. A simulation method used to simulate a sensor network comprising:
   generating a virtual sensor network, wherein the virtual sensor network comprises a virtual node corresponding to a real node on a testbed and a simulation node neighboring the virtual node and existing only in a simulation, and wherein the virtual node is configured to communicate with the simulation node; and
   performing bidirectional communication between the real node and the virtual node such that a communication status of either the virtual node or the real node is reflected in a communication status of the other node.

9. The method of claim 8, wherein the real node has a neighbor table that includes information about the simulation node and that is renewed by a neighbor table generated by the virtual node and the simulation node.

10. The method of claim 8, wherein the performing of the bidirectional communication comprises:
    receiving a packet that was received by the real node from a previous hop node and transmitting the packet to a corresponding virtual node.

11. The method of claim 10, wherein the performing of the bidirectional communication comprises:
    if a node of a next hop of the real node is the simulation node, transmitting an acknowledge signal, indicating that the corresponding virtual node transmits the packet to the simulation node, to the real node.

12. The method of claim 8, wherein the performing of the bidirectional communication comprises:
    transmitting a CS result of the corresponding virtual node to the real node that delays transmitting the packet to the node of the next hop until the CS result is received.

13. The method of claim 8, wherein the performing of the bidirectional communication comprises:
    if the real node does not receive the packet from a real node of the previous hop and the corresponding virtual node receives the same packet from a virtual node of the previous hop, discarding the packet received from the virtual node of the previous hop by using the corresponding virtual node.

14. The method of claim 8, wherein the performing of the bidirectional communication comprises:
    if the real node receives the packet from a real node of the previous hop and the corresponding virtual node does not receive the same packet from a virtual node of the previous hop, discarding the packet received from the real node of the previous hop by using the real node.

\* \* \* \* \*